(12) United States Patent
Zhang

(10) Patent No.: US 10,914,220 B2
(45) Date of Patent: Feb. 9, 2021

(54) METHOD, DEVICE, AND SYSTEM FOR OPERATING A NITROGEN OXIDE SENSOR

(71) Applicant: Continental Automotive GmbH, Hannover (DE)

(72) Inventor: Hong Zhang, Tegernheim (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 312 days.

(21) Appl. No.: 16/061,267

(22) PCT Filed: Nov. 17, 2016

(86) PCT No.: PCT/EP2016/077938
§ 371 (c)(1),
(2) Date: Jun. 11, 2018

(87) PCT Pub. No.: WO2017/097557
PCT Pub. Date: Jun. 15, 2017

(65) Prior Publication Data
US 2020/0263593 A1    Aug. 20, 2020

(30) Foreign Application Priority Data

Dec. 11, 2015 (DE) .................... 10 2015 224 935

(51) Int. Cl.
*F01N 11/00* (2006.01)
*F02D 41/14* (2006.01)
(Continued)

(52) U.S. Cl.
CPC ........ *F01N 11/007* (2013.01); *F02D 41/1461* (2013.01); *F01N 9/00* (2013.01);
(Continued)

(58) Field of Classification Search
CPC ........ F01N 3/208; F01N 11/00; F01N 11/007; F01N 2560/026; F01N 2560/14; F01N 2610/02
See application file for complete search history.

(56) References Cited

U.S. PATENT DOCUMENTS 5,877,413 A    3/1999  Hamburg et al.
8,056,404 B2   11/2011 Murase
(Continued)

FOREIGN PATENT DOCUMENTS

CN    101341315    1/2009
CN    101646855    2/2010
(Continued)

OTHER PUBLICATIONS

Office Action dated Oct. 23, 2019 issued in Chinese Patent Application No. 201680072551.6.

*Primary Examiner* — Jonathan R Matthias
(74) *Attorney, Agent, or Firm* — Cozen O'Connor

(57) ABSTRACT

A method for operating a nitrogen oxide sensor of a vehicle having a first nitrogen oxide sensor, a second nitrogen oxide sensor and a catalytic converter, one of the first and second nitrogen oxide sensors being arranged upstream of the catalytic converter with respect to the exhaust gas flow direction, and the other of the first and second nitrogen oxide sensors being arranged downstream of the catalytic converter, includes: determining a first characteristic value of the first nitrogen oxide sensor; determining a second characteristic value of the second nitrogen oxide sensor determining a ratio of the first characteristic value to the second characteristic value; and adapting a sensor or measured value of the second nitrogen oxide sensor in accordance with the ratio of the first characteristic value to the second characteristic value.

10 Claims, 2 Drawing Sheets

(51) Int. Cl.
*F01N 9/00* (2006.01)
*F02D 41/24* (2006.01)

(52) U.S. Cl.
CPC .... *F01N 2560/026* (2013.01); *F01N 2560/14* (2013.01); *F01N 2900/08* (2013.01); *F01N 2900/1402* (2013.01); *F02D 41/1495* (2013.01); *F02D 41/2474* (2013.01)

(56) References Cited

U.S. PATENT DOCUMENTS

| | | | |
|---|---|---|---|
| 9,678,049 B2 | 6/2017 | Lahr | |
| 2009/0155130 A1* | 6/2009 | Choi | F01N 3/208 422/111 |
| 2009/0242427 A1 | 10/2009 | Muroguchi et al. | |
| 2010/0199636 A1* | 8/2010 | Goya | F01N 13/009 60/276 |
| 2015/0276694 A1* | 10/2015 | Lahr | G01N 33/0006 73/1.06 |

FOREIGN PATENT DOCUMENTS

| | | |
|---|---|---|
| CN | 102297007 | 12/2011 |
| CN | 102792140 | 11/2012 |
| DE | 69921895 T2 | 12/2005 |
| DE | 10 2004 051747 A1 | 4/2006 |
| DE | 10 2009 002347 | 6/2013 |
| DE | 10 2012 019633 A1 | 4/2014 |
| DE | 10 2013 209487 A1 | 11/2014 |
| EP | 0869356 A2 | 7/1998 |
| EP | 0869356 A2 | 10/1998 |
| EP | 0869356 A3 | 10/2000 |
| EP | 0869356 B1 | 2/2007 |
| EP | 2 119 897 A1 | 11/2009 |
| WO | WO 2011/075582 A1 | 6/2001 |

* cited by examiner

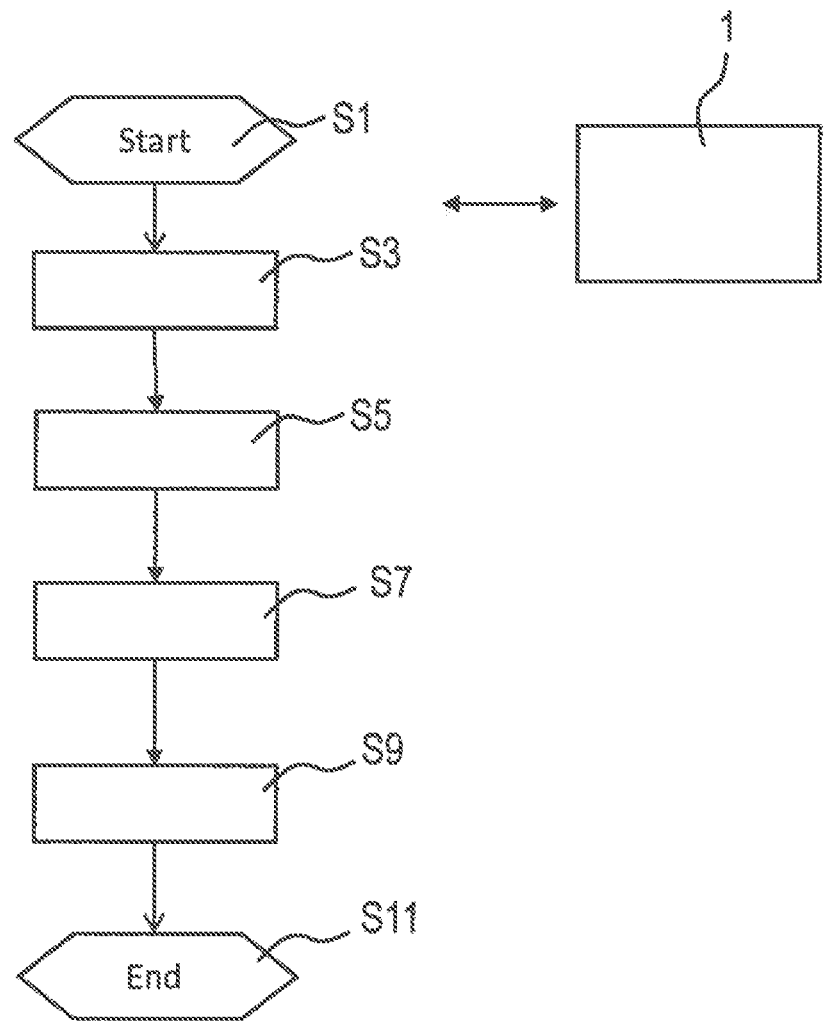

METHOD, DEVICE, AND SYSTEM FOR OPERATING A NITROGEN OXIDE SENSOR

CROSS-REFERENCE TO RELATED APPLICATIONS

This is a U.S. national stage of application No. PCT/EP2016/077938 filed on 17 Nov. 2016, which claims priority to the Germany Application No. 10 2015 224 935.2 filed 11 Dec. 2015, the content of both incorporated herein by reference.

BACKGROUND OF THE INVENTION

1. Field of the Invention

The invention relates to a method, a device, and a system for operating a nitrogen oxide sensor of a vehicle.

2. Related Art

Ever more stringent regulatory requirements relating to permissible pollutant emissions in motor vehicles in which internal combustion engines are arranged make it necessary to keep the pollutant emissions during the operation of the internal combustion engine as low as possible. On account of this, it is necessary for the pollutant components in the exhaust tract to be determined in a very precise manner, in particular for the use of exhaust gas post-treatment systems such as catalytic converters.

To determine the nitrogen oxide content of the exhaust gas, use is made, in particular, of nitrogen oxide sensors.

A nitrogen oxide sensor based on $ZrO_2$ ceramics and having two chambers is known from the reference manual "Handbuch Verbrennungsmotoren" [Internal Combustion Engine Handbook], edited by Richard von Basshuysen/Fred Schäfer, 2nd edition, June 2002, Friedrich Vieweg & Sohn Verlagsgesellschaft mbH Braunschweig/Wiesbaden, page 589 ff. A constant partial pressure of the oxygen contained in the exhaust gas is established in the first chamber by applying a pumping current. The pumping current is proportional to the air-to-fuel ratio, for example. The nitrogen oxide contained in the exhaust gas is decomposed in the second chamber by applying a further current. Thereupon, a current proportional to the nitrogen oxide content in the exhaust gas and, which forms the measurement signal of the nitrogen oxide sensor, can be measured on a measuring electrode in the second chamber.

SUMMARY OF THE INVENTION

It is an object of the invention to provide a method and a device which contribute to very reliable operation of a nitrogen oxide sensor.

Said object is achieved by a method for operating a nitrogen oxide sensor of a vehicle having a first nitrogen oxide sensor, a second nitrogen oxide sensor and a catalytic converter, wherein one of the two nitrogen oxide sensors is arranged ahead of the catalytic converter in the exhaust gas flow direction, and the other nitrogen oxide sensor is arranged after the catalytic converter in the exhaust gas flow direction. The invention is furthermore distinguished by a device for operating the nitrogen oxide sensor, wherein the device is designed to perform the method for operating the nitrogen oxide sensor. The invention is furthermore distinguished by a system having the device for operating the nitrogen oxide sensor, the first nitrogen oxide sensor, the second nitrogen oxide sensor and the catalytic converter. The system comprises the vehicle, for example.

In the method for operating a nitrogen oxide sensor, a first characteristic value of the first nitrogen oxide sensor is determined.

A second characteristic value of the second nitrogen oxide sensor is determined. A ratio of the first characteristic value to the second characteristic value is determined. A sensor measured value of the second nitrogen oxide sensor is adapted in accordance with the ratio of the first characteristic value to the second characteristic value.

Adapting the sensor measured value of the nitrogen oxide sensors is difficult since there is a high cross-sensitivity between the oxygen and the NOx concentration. The method for operating the nitrogen oxide sensor makes it possible, in the case of a nitrogen oxide sensor, which can also be referred to as an NOx sensor, to compensate for a very large signal drift without significantly impairing signal quality, in particular for NH3 control and/or SCR (selective catalytic reduction) catalytic converter diagnosis. Such signal drift arises when there is magnesium poisoning, for example. Thus, very high robustness of the sensor measured values of the nitrogen oxide sensors can be achieved. Since a ratio of two nitrogen oxide sensors is used in the adaptation, i.e., a characteristic of a nitrogen oxide sensor that is arranged ahead of the catalytic converter in the exhaust gas flow direction and a characteristic value of a nitrogen oxide sensor that is arranged after the catalytic converter in the exhaust gas flow direction, cross-sensitivities between the oxygen and NOx concentration and variation in the exhaust gas backpressure can be minimized.

In particular, the first and second characteristic value are determined in a predetermined operating state in which, in particular, both the oxygen concentration and the nitrogen oxide concentration are constant and approximately the same in the case of both nitrogen oxide sensors. Such operating states comprise engine after-running and/or an overrun shutdown phase, for example. If, for example, the concentration differences before and after the determination of the two characteristic values exceed a respective limit value and/or if the concentration differences between the two nitrogen oxide sensors exceed a respective limit value, the two characteristic values are not suitable for adaptation of the sensor measured value in accordance with the ratio of the first characteristic value to the second characteristic value.

Here, adaptation of the sensor measured value comprises, in particular, future adaptation of the sensor measured values until the two characteristic values are determined again. For this purpose, the ratio of the two characteristic values is permanently stored, for example, or some other permanently stored parameter relevant for the determination of future sensor measured values is corrected by the ratio.

In particular, the nitrogen oxide sensor is a nitrogen oxide sensor having two or more chambers, in which, for example, a first pumping current in a first chamber can be set in such a way that disruptive gases flow back out of the nitrogen oxide sensor, thus enabling the gas to be measured to be measured in a second chamber or a further chamber. This is achieved, for example, by producing a constant partial pressure of the oxygen contained in the exhaust gas by applying the first pumping current. In the nitrogen oxide sensor, it is furthermore possible, for example, for a second pumping current to be set in such a way that the gas which is to be measured is decomposed in the second chamber or a further chamber and it is possible to measure a current in the second chamber or the further chamber that is proportional to the content of the gas to be measured in the exhaust gas and that forms the sensor measurement signal of the nitrogen oxide sensor.

According to an advantageous aspect, the first and the second characteristic value are representative of a self-diagnosis value of the respective nitrogen oxide sensor.

This enables particularly quick and simple adaptation of the nitrogen oxide sensors since self-diagnosis is possible even during normal driving.

According to another advantageous aspect, the self-diagnosis value is representative of a ratio of a measured oxygen concentration to a predetermined reference oxygen concentration.

In particular, the self-diagnosis value is subject to low-pass filtering, e.g., using a filter constant less than a drift time constant.

In particular, the reference oxygen concentration corresponds to a further oxygen concentration of the respective nitrogen oxide sensor that has been measured under similar conditions to the oxygen concentration but with the respective nitrogen oxide sensor in a new state.

According to another advantageous embodiment, the first, and the second characteristic value are representative of a measured nitrogen oxide value in a predetermined operating state of the vehicle.

The predetermined operating state comprises one of the above-explained operating states, for example. In particular, the first and the second characteristic value, representative of a measured nitrogen oxide value, are determined during a visit to a repair garage. During this process, the vehicle is, in particular, operated in a constant operating state, e.g., with an NOx value of over 400 ppm. Moreover, NH3 dosing of the catalytic converter, in particular, is ended. If, in particular, the oxygen concentration and the nitrogen oxide concentration then remain constant at both nitrogen oxide sensors and remain approximately the same, the respective characteristic values can be determined. Very accurate adaptation of the nitrogen oxide sensors is thereby possible.

According to another advantageous embodiment, the adaptation is performed such that, after adaptation, the ratio of the sensor measured value of the first nitrogen oxide sensor to the sensor measured value of the second nitrogen oxide sensor is approximately 1.

To achieve this, it is not absolutely necessary to determine or detect sensor measured values again, it being sufficient if, were a sensor measured value of the first nitrogen oxide sensor and a sensor measured value of the second nitrogen oxide sensor theoretically to be determined or detected after adaptation, the ratio of the two sensor measured values would be approximately 1.

According to another advantageous aspect, the adaptation is performed by correcting a predetermined characteristic curve of the second nitrogen oxide sensor.

In particular, the corrected characteristic curve is permanently stored. Errors in connection with a shift in the characteristic curve are optionally deleted if such errors are already present.

According to another advantageous aspect, the adaptation is performed by multiplying the ratio of the first characteristic value to the second characteristic value by a predetermined gradient value of the characteristic curve of the second nitrogen oxide sensor.

According to another advantageous aspect, the ratio of the first characteristic value to the second characteristic value is compared with a predetermined maximum value. If the ratio of the first characteristic value to the second characteristic value is higher than the maximum value, the adaptation is performed by multiplying the maximum value by the predetermined gradient value of the characteristic curve of the second nitrogen oxide sensor. If the ratio of the first characteristic value to the second characteristic value is lower than the maximum value, the adaptation is performed by multiplying the ratio of the first characteristic value to the second characteristic value by the predetermined gradient value of the characteristic curve of the second nitrogen oxide sensor.

It is thereby possible to set a maximum adaptation value since greater adaptation might not be useful.

For the additional aspect, the first nitrogen oxide sensor is, in particular, arranged after the catalytic converter in the exhaust gas flow direction, and the second nitrogen oxide sensor is arranged ahead of the catalytic converter in the exhaust gas flow direction.

According to another advantageous aspect, the first characteristic value is compared with a predetermined first minimum value and, if the first characteristic value is less than the first minimum value, the first nitrogen oxide sensor is classified as faulty.

According to another advantageous aspect, the second characteristic value is compared with a predetermined second minimum value and, if the second characteristic value is less than the second minimum value, the second nitrogen oxide sensor is classified as faulty.

BRIEF DESCRIPTION OF THE DRAWINGS

Exemplary embodiments of the invention will be explained in more detail hereinbelow by the schematic drawings.

In the drawings:

FIG. 2 shows a flowchart relating to the operation of a nitrogen oxide sensor.

DETAILED DESCRIPTION OF THE PRESENTLY PREFERRED EMBODIMENTS

Figure 1A:
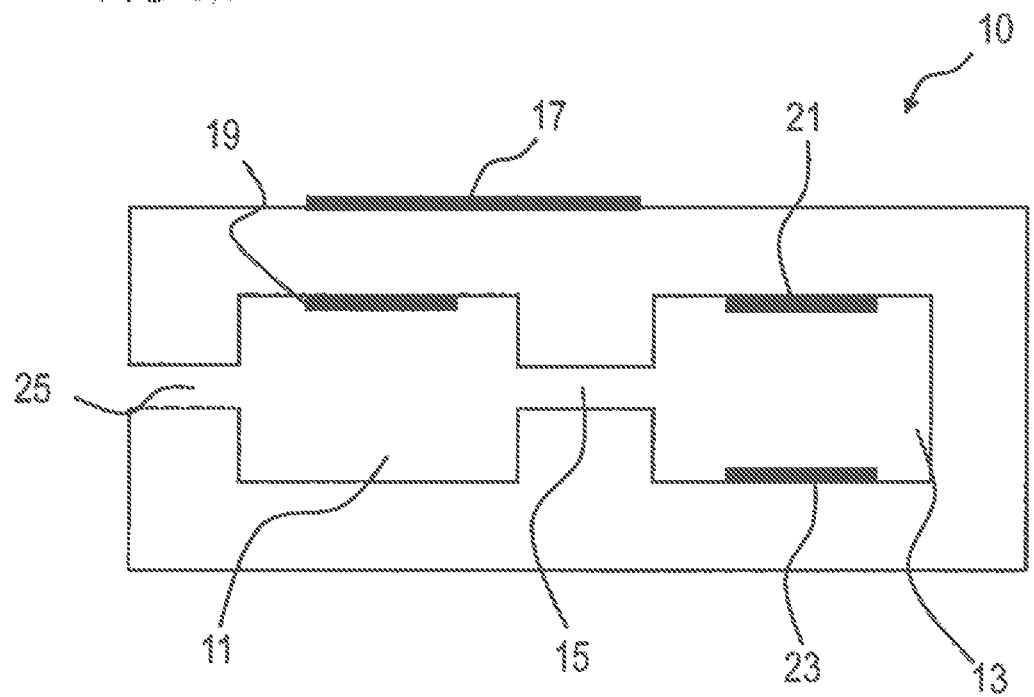
FIG. 1A shows a nitrogen oxide sensor in accordance with the present invention.
Figure 1B:
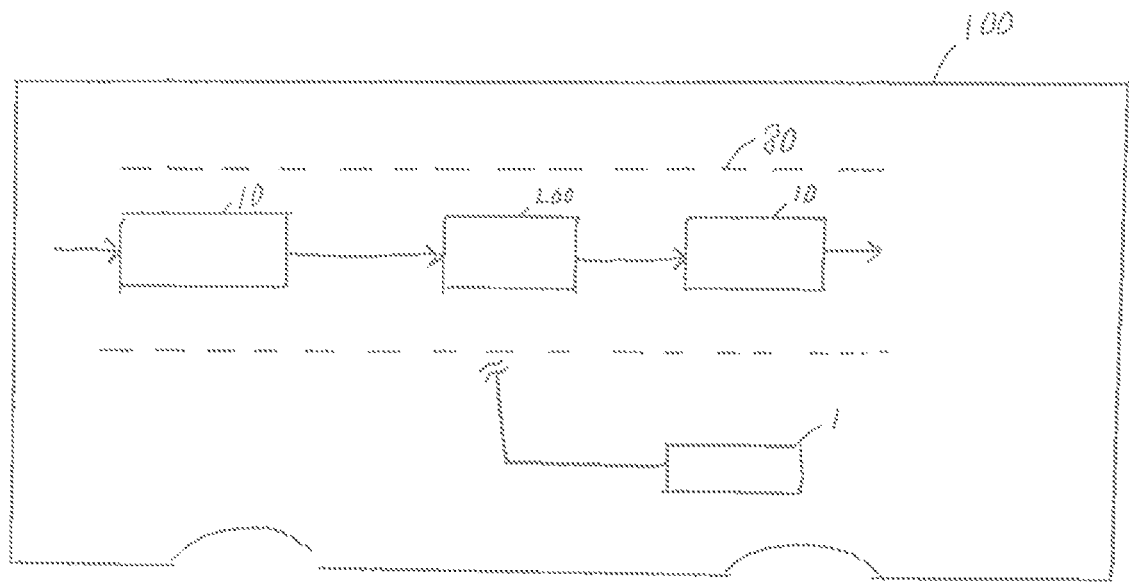
FIG. 1B shows two nitrogen oxide sensors as shown in FIG. 1A arranged in an exhaust tract of a vehicle.

FIG. 1A shows an instance of a nitrogen oxide sensor 10. FIG. 1B shows two nitrogen oxide sensors 10 arranged, in an exhaust tract 80 of a vehicle 100.

In particular, the vehicle 100 has a first nitrogen oxide sensor 10, a second nitrogen oxide sensor 10 and a catalytic converter 200, arranged in the exhaust tract 80. One of the two nitrogen oxide sensors 10 is arranged upstream (i.e., ahead of) the catalytic converter 200 in the exhaust gas flow direction (see arrow), and the other nitrogen oxide sensor 10 is arranged downstream (i.e., after) the catalytic converter 200 in the exhaust gas flow direction indicated by the arrows. In particular, the catalytic converter 200 is an SCR catalytic converter.

As can be seen in FIG. 1A nitrogen oxide sensor 10 has an inlet 25, for example, through which exhaust gas can flow into a first chamber 11. Furthermore, the nitrogen oxide sensor 10 has a diffusion path 15 and a second chamber 13. Furthermore, the nitrogen oxide sensor 10 can have further chambers and further diffusion paths.

In particular, the nitrogen oxide sensor 10 has a pumping electrode 17 for each chamber 11, 13 or, as shown, has a common pumping electrode 17.

In addition, it has a ground electrode 19, 21 for the first chamber 11 and the second chamber 13 individually or for both chambers in common.

A measurement electrode 23 is furthermore arranged in the second chamber 13.

By the pumping electrode 17 and the ground electrode 19, it is possible, for example, to establish a first pumping current in the first chamber 11 such that disruptive gases flow back out of the inlet 25, thus ensuring that the gas content of the gas to be measured can be measured in the second chamber 13, the gas entering the second chamber 13 via the diffusion path 15. This is achieved, for example, by producing a constant partial pressure of the oxygen contained in the exhaust gas by applying the first pumping current. The first pumping current is proportional to the air-to-fuel ratio, for example.

By the pumping electrode 17 and the ground electrode 21, it is possible, for example, to establish a second pumping current such that the gas which is to be measured is decomposed in the second chamber 13.

The current measured across the measurement electrode 23 is proportional to the gas content to be measured in the exhaust gas. This current forms the sensor measurement signal of the nitrogen oxide sensor 10.

During normal operation of the sensor, the first chamber 11 has an $O_2$ content in the range of a few ppm (parts per million), for example. However, the second chamber 13 now has only a very low $O_2$ content, e.g. $10^{-3}$ ppm, and therefore the sensor measurement signal is representative of a nitrogen oxide content, e.g., an NO content, since NO is decomposed into $½NO+½O_2$, for example.

In a self-diagnosis mode, however, the nitrogen oxide sensor 10 can be operated such that an $O_2$ content in the second chamber 13 is approximately 1000 ppm. An oxygen concentration measured in the self-diagnosis mode can then be compared with a predetermined reference oxygen concentration for the purpose of self-diagnosis. The reference oxygen concentration is, for example, a value that has been measured at the nitrogen oxide sensor 10 in a new state and is stored in an EEPROM of the nitrogen oxide sensor 10, for example. Here, the EEPROM is a non-volatile electronic memory component. Since the reference oxygen concentration has been measured at the nitrogen oxide sensor 10 in a new state, the ratio of the oxygen concentration to the reference oxygen concentration in the case of a new nitrogen oxide sensor 10 should be 1.

A controller 1 is configured to operate the first nitrogen oxide sensor 10 and the second nitrogen oxide sensor 10, that is to say, in particular, to activate the pumping electrodes 17 of the nitrogen oxide sensors 10 and to receive the respective sensor measurement signal. For this purpose, the controller 1 has, in particular, a CPU, a program and data memory and, for example, one or mere communication interfaces. The program and data memory and/or the CPU and/Gr the communication interfaces can foe formed in a single module and/or can be distributed between several modules.

The controller 1 can also be referred to as a device for operating a nitrogen oxide sensor 10.

For this purpose, a program for operating the nitrogen oxide sensor 10, in particular, is stored in the data and program memory of the controller 1.

FIG. 2 shows a flowchart of the program for operating the nitrogen oxide sensor 10, The program is started in a step S1, in which variables can optionally be initialized.

In a step S3, a first characteristic value of the first nitrogen oxide sensor 10 is determined.

In a step S5, a second characteristic value of the second nitrogen oxide sensor 10 is determined.

The first and the second characteristic value are representative of a self-diagnosis value of the respective nitrogen oxide sensor 10, for example. The self-diagnosis value corresponds, for example, to a ratio of the oxygen concentration measured in the self-diagnosis method to the predetermined reference oxygen concentration.

Alternatively or in addition, the first and the second characteristic value are representative of a measured nitrogen oxide value in a predetermined operating state of the vehicle.

In a step S7, a ratio of the first characteristic value to the second characteristic value is determined.

In a step S9, a sensor measured value of the second nitrogen oxide sensor 10 is adapted in accordance with the ratio of the first characteristic value to the second characteristic value.

Here, adaptation of the sensor measured value comprises, in particular, future adaptation of the sensor measured values until the two characteristic values are determined again. For this purpose, the ratio of the two characteristic values is permanently stored, for example, or some other permanently stored parameter relevant for the determination of future sensor measured values is corrected by the ratio.

Adaptation is performed such that, for example, were a sensor measured value of the first nitrogen oxide sensor 10 and a sensor measured value of the second nitrogen oxide sensor 10 to be determined or detected after adaptation, the ratio of the two sensor measured values would be approximately 1.

Alternatively or in addition, the adaptation is performed by correcting a predetermined characteristic curve of the second nitrogen oxide sensor 10.

Alternatively or in addition, the adaptation is performed by multiplying the ratio of the first characteristic value to the second characteristic value by a predetermined gradient value of the characteristic curve of the second nitrogen oxide sensor 10.

Alternatively or in addition, the adaptation is performed such a way that the ratio of the first characteristic value to the second characteristic value is first of all compared with a predetermined maximum value. If the ratio of the first characteristic value to the second characteristic value is higher than the maximum value, the adaptation is performed by multiplying the maximum value by the predetermined gradient value of the characteristic curve of the second nitrogen oxide sensor 10. If the ratio of the first characteristic value to the second characteristic value is lower than the maximum value, the adaptation is performed by multiplying the ratio of the first characteristic value to the second characteristic value by the predetermined gradient value of the characteristic curve of the second nitrogen oxide sensor 10. The maximum value is 2, for example.

The first characteristic value and the second characteristic value can additionally be compared with a respective minimum value, for example. In this case, adaptation is performed only if the respective characteristic value is higher than the respective minimum value, for example. If the respective characteristic value is lower than the respective minimum value, the respective nitrogen oxide sensor 10 is classified as faulty. The minimum value for the nitrogen oxide sensor 10, which is arranged after the catalytic converter in the exhaust gas flow direction, is 50%, for example. The minimum value for the nitrogen oxide sensor 10, which is arranged ahead of the catalytic converter in the exhaust gas flow direction, is 25%, for example. Thus, the minimum value for the nitrogen oxide sensor 10, which is arranged after the catalytic converter in the exhaust gas flow direction, is higher than the minimum value for the nitrogen oxide sensor 10, which is arranged ahead of the catalytic converter in the exhaust gas flow direction, for example.

In a step S11, the program is ended and can, if appropriate, be started again in the step S1.

In this way, it is possible, in particular, to correct a characteristic curve drift of the second nitrogen oxide sensor 10. If the first nitrogen oxide sensor 10, is arranged after the catalytic converter in the exhaust gas flow direction and the second nitrogen oxide sensor 10 is arranged ahead of the catalytic converter in the exhaust gas flow direction, it is possible in this way to adapt the nitrogen oxide sensor 10, which is arranged ahead of the catalytic converter in the exhaust gas flow direction. However, it is just as easily possible to adapt the nitrogen oxide sensor 10 which is arranged after the catalytic converter 10 in the exhaust gas flow direction, if the second nitrogen oxide sensor 10 is arranged after the catalytic converter in the exhaust gas flow direction and the first nitrogen oxide sensor 10 is arranged ahead of the catalytic converter in the exhaust gas flow direction.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a nitrogen oxide sensor (10) of a vehicle having a first nitrogen oxide sensor (10), a second nitrogen oxide sensor (10) and a catalytic converter, wherein one of the first and second nitrogen oxide sensors (10) is arranged upstream of the catalytic converter with respect to the exhaust gas flow direction, and the other of the first and second nitrogen oxide sensors (10) is arranged downstream of the catalytic converter with respect to the exhaust gas flow direction, the method comprising:
   determining a first characteristic value of the first nitrogen oxide sensor (10);
   determining a second characteristic value of the second nitrogen oxide sensor (10);
   determining a ratio of the first characteristic value to the second characteristic value; and
   adapting a sensor measured value of the second nitrogen oxide sensor (10) in accordance with the ratio of the first characteristic value to the second characteristic value,
   wherein the first and the second characteristic value are representative of a self-diagnosis value of the respective nitrogen oxide sensors (10), and
   wherein the self-diagnosis value is a low-pass filtered current representative of a ratio of a measured oxygen concentration to a predetermined reference oxygen concentration.

2. The method as claimed in claim 1, wherein the first and the second characteristic values are representative of a measured nitrogen oxide value in a predetermined operating state of the vehicle.

3. The method as claimed in claim 1, wherein the adapting is performed such that, after adapting, the ratio of the sensor measured value of the first nitrogen oxide sensor (10) to the sensor measured value of the second nitrogen oxide sensor (10) is approximately 1.

4. The method as claimed in claim 1, wherein the adapting comprises correcting a predetermined characteristic curve of the second nitrogen oxide sensor (10).

5. The method as claimed in claim 4, wherein the adapting comprises multiplying the ratio of the first characteristic value to the second characteristic value by a predetermined gradient value of the characteristic curve of the second nitrogen oxide sensor (10).

6. The method as claimed in claim 1, wherein:
   the first nitrogen oxide sensor (10) is arranged downstream of the catalytic converter with respect to the exhaust gas flow direction, and the second nitrogen oxide sensor (10) is arranged upstream of the catalytic converter with respect to the exhaust gas flow direction, and
   the first characteristic value is compared with a predetermined first minimum value and, in a case that the first characteristic value is less than the first minimum value, the first nitrogen oxide sensor (10) is classified as faulty.

7. The method as claimed in claim 1, wherein:
   the first nitrogen oxide sensor (10) is arranged downstream of the catalytic converter with respect to the exhaust gas flow direction, and the second nitrogen oxide sensor (10) is arranged upstream of the catalytic converter with respect to the exhaust gas flow direction,
   wherein the second characteristic value is compared with a predetermined second minimum value and, if the second characteristic value is less than the second minimum value, the second nitrogen oxide sensor (10) is classified as faulty.

8. A method for operating a nitrogen oxide sensor (10) of a vehicle having a first nitrogen oxide sensor (10), a second nitrogen oxide sensor (10) and a catalytic converter, wherein one of the first and second nitrogen oxide sensors (10) is arranged upstream of the catalytic converter with respect to the exhaust gas flow direction, and the other of the first and second nitrogen oxide sensors (10) is arranged downstream of the catalytic converter with respect to the exhaust gas flow direction, the method comprising:
   determining a first characteristic value of the first nitrogen oxide sensor (10);
   determining a second characteristic value of the second nitrogen oxide sensor (10);
   determining a ratio of the first characteristic value to the second characteristic value;
   adapting a sensor measured value of the second nitrogen oxide sensor (10) in accordance with the ratio of the first characteristic value to the second characteristic value,
   wherein the adapting comprises correcting a predetermined characteristic curve of the second nitrogen oxide sensor (10), and wherein the adapting comprises multiplying the ratio of the first characteristic value to the second characteristic value by a predetermined gradient value of the characteristic curve of the second nitrogen oxide sensor (10); and comparing the ratio of the first characteristic value to the second characteristic value with a predetermined maximum value, wherein:

in a case in which the ratio of the first characteristic value to the second characteristic value is higher than the maximum value, the adapting is performed by multiplying the maximum value by the predetermined gradient value of the characteristic curve of the second nitrogen oxide sensor (10), and in a case in which the ratio of the first characteristic value to the second characteristic value is lower than the maximum value, the adapting is performed by multiplying the ratio of the first characteristic value to the second characteristic value by the predetermined gradient value of the characteristic curve of the second nitrogen oxide sensor (10).

9. A device for operating a nitrogen oxide sensor (10), the device comprising a controller configured to carry out the method as claimed in claim 8.

10. A system comprising: a device as claimed in claim 9, a first nitrogen oxide sensor (10), a second nitrogen oxide sensor (10) and a catalytic converter, wherein one of the first and second nitrogen oxide sensors (10) is arranged upstream of the catalytic converter with respect to the exhaust gas flow direction, and the other of the first and second nitrogen oxide sensors (10) is arranged downstream of the catalytic converter with respect to the exhaust gas flow direction.

* * * * *